US010810681B1

(12) United States Patent
Parker et al.

(10) Patent No.: US 10,810,681 B1
(45) Date of Patent: Oct. 20, 2020

(54) HOME DEVICE SENSING

(71) Applicant: Allstate Insurance Company, Northbrook, IL (US)

(72) Inventors: Carolyn Parker, Libertyville, IL (US); Robert H. Johnson, Hoffman Estates, IL (US); Nicholas A. Suizzo, Cody, WY (US); Rothana Srey, Dekalb, IL (US); Sean P. Willett, Chicago, IL (US); Regina Madigan, Mountain View, CA (US); Nan Zhang, Buffalo Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/458,463

(22) Filed: Jul. 1, 2019

Related U.S. Application Data

(63) Continuation of application No. 14/186,187, filed on Feb. 21, 2014, now Pat. No. 10,380,692.

(51) Int. Cl.
*G06Q 40/08* (2012.01)
*G06Q 40/00* (2012.01)
*H04L 12/26* (2006.01)

(52) U.S. Cl.
CPC ............. *G06Q 40/08* (2013.01); *G06Q 40/00* (2013.01); *H04L 43/0817* (2013.01)

(58) Field of Classification Search
CPC ........ G06Q 40/08; G06Q 40/02; G06Q 40/06; G06Q 10/0635; H04L 43/0817

(Continued)

(56) References Cited

U.S. PATENT DOCUMENTS 5,523,942 A * 6/1996 Tyler ...................... G06Q 30/04
705/34
5,648,724 A * 7/1997 Yankielun .......... G01R 27/2664
324/532

(Continued)

FOREIGN PATENT DOCUMENTS

AU 2010204729 A1 9/2011
AU 2010249515 1/2012

(Continued)

OTHER PUBLICATIONS

Kevin Lisota, "Review: At home with Wally, a new sensor network for detecting water leaks" Feb. 26, 2014, https://www.geekwire.com/2014/review-home-test-wally-water-leak-sensor-network/ (via the internet archives). (Year: 2014).*

(Continued)

*Primary Examiner* — Kelly S Campen
(74) *Attorney, Agent, or Firm* — Banner & Witcoff, Ltd.

(57) ABSTRACT

Systems, methods, apparatuses and computer-readable media for receiving data from one or more sensors associated with one or more home devices, such as appliances, home systems, etc. are presented. In some examples, the data may be used to determine whether the home device is operating within an expected range. The data may also be used to determine an insurance rate or premium for a user associated with the home device(s). In some arrangements, the data may be used to determine an age of a home device, as well as a likelihood of failure of that device. This information may be used to determine or adjust insurance premiums or rates and/or provide incentives to users to repair or replace the home device(s).

20 Claims, 9 Drawing Sheets

(58) Field of Classification Search
USPC .................................. 705/4, 35, 36 R, 7.28
See application file for complete search history.

(56) References Cited

U.S. PATENT DOCUMENTS

| | | | | |
|---|---|---|---|---|
| 5,818,340 A * | 10/1998 | Yankielun | ............. | E04D 13/006 340/602 |
| 5,884,274 A * | 3/1999 | Walker | .................. | G06Q 40/00 235/379 |
| 5,893,072 A * | 4/1999 | Zizzamia | .............. | G06Q 40/08 705/4 |
| 5,970,464 A * | 10/1999 | Apte | ...................... | G06Q 40/08 705/4 |
| 6,009,402 A * | 12/1999 | Whitworth | ............ | G06Q 40/08 705/4 |
| 6,113,493 A * | 9/2000 | Walker | .................. | G07F 17/32 463/20 |
| 6,128,598 A * | 10/2000 | Walker | .................. | G06Q 40/00 235/379 |
| 6,529,723 B1 * | 3/2003 | Bentley | ............... | B60R 25/1004 340/573.1 |
| 6,552,647 B1 * | 4/2003 | Thiessen | ................ | G05B 15/02 122/448.1 |
| 6,561,903 B2 * | 5/2003 | Walker | ................. | G07F 17/32 463/20 |
| 6,575,234 B2 * | 6/2003 | Nelson | .................... | F24D 7/00 126/586 |
| 6,583,720 B1 * | 6/2003 | Quigley | ............... | G08B 19/005 340/506 |
| 6,684,190 B1 * | 1/2004 | Powers | ................. | G06Q 40/06 705/36 R |
| 6,823,258 B2 * | 11/2004 | Ukai | ..................... | G01S 5/0027 340/436 |
| 6,853,958 B1 * | 2/2005 | Turin | ...................... | H04L 12/66 702/182 |
| 6,950,801 B2 * | 9/2005 | Brookes | .......... | G06Q 10/06315 705/7.25 |
| 6,995,676 B2 * | 2/2006 | Amacher | .............. | G08B 21/20 340/539.22 |
| 7,088,239 B2 * | 8/2006 | Basinger | ............... | G01D 4/004 340/539.17 |
| 7,203,654 B2 * | 4/2007 | Menendez | ............ | G06Q 10/10 705/4 |
| 7,230,528 B2 * | 6/2007 | Kates | ................... | G08B 25/009 340/521 |
| 7,243,050 B2 * | 7/2007 | Armstrong | ............. | G05D 22/02 702/188 |
| 7,263,450 B2 * | 8/2007 | Hunter | .................. | G01D 4/004 324/76.11 |
| 7,292,155 B2 * | 11/2007 | Vokey | ................... | E04D 13/006 340/602 |
| 7,336,168 B2 * | 2/2008 | Kates | ................. | G08B 21/0236 340/506 |
| 7,339,483 B1 * | 3/2008 | Farmer | ................. | G06Q 30/02 340/425.5 |
| 7,467,065 B2 * | 12/2008 | Neel | ...................... | G16H 40/63 702/183 |
| 7,605,696 B2 * | 10/2009 | Quatro | ................ | G06Q 10/08 340/539.13 |
| 7,610,210 B2 * | 10/2009 | Helitzer | ................ | G06Q 40/08 705/1.1 |
| 7,630,986 B1 * | 12/2009 | Herz | ..................... | G06Q 10/10 |
| 7,688,215 B2 * | 3/2010 | Vokey | .................... | G01M 3/16 340/601 |
| 7,711,584 B2 * | 5/2010 | Helitzer | ................ | G06Q 40/08 705/4 |
| 7,716,077 B1 * | 5/2010 | Mikurak | ................ | G06Q 10/06 705/7.12 |
| 7,769,608 B1 * | 8/2010 | Woll | ...................... | G06Q 50/16 705/4 |
| 7,873,527 B2 * | 1/2011 | Dordick | ................ | G06Q 40/08 705/4 |
| 7,941,330 B1 * | 5/2011 | Buentello | .............. | G06Q 40/08 705/4 |
| 8,036,160 B1 * | 10/2011 | Oakes, III | .............. | G06Q 30/02 370/328 |
| 8,041,636 B1 * | 10/2011 | Hunter | ................... | G06Q 20/10 705/26.1 |
| 8,046,244 B1 * | 10/2011 | Yager | ..................... | G06Q 40/08 705/4 |
| 8,077,927 B1 * | 12/2011 | Maltby, II | .......... | G06K 9/00476 382/113 |
| 8,106,769 B1 * | 1/2012 | Maroney | ............... | G06Q 10/10 340/540 |
| 8,145,578 B2 * | 3/2012 | Pershing | ................ | G06Q 10/00 705/400 |
| 8,265,964 B2 * | 9/2012 | Read | ...................... | G06Q 40/08 705/4 |
| 8,271,303 B2 | 9/2012 | Helitzer et al. | | |
| 8,271,308 B2 * | 9/2012 | Winkler | ............... | G06Q 10/087 340/572.8 |
| 8,280,633 B1 * | 10/2012 | Eldering | ................ | G06Q 40/08 702/3 |
| 8,289,160 B1 * | 10/2012 | Billman | ................ | G08B 21/18 340/540 |
| 8,319,508 B2 * | 11/2012 | Vokey | ..................... | C23F 13/02 324/522 |
| 8,340,997 B2 * | 12/2012 | Vandrilla | ............... | G06Q 40/08 705/7.11 |
| 8,359,211 B2 * | 1/2013 | English | ............... | H04L 61/2007 705/4 |
| 8,364,609 B2 * | 1/2013 | Ozog | .................. | G06Q 10/06315 705/412 |
| 8,374,729 B2 * | 2/2013 | Chapel | ............... | H02J 13/0082 700/295 |
| 8,378,808 B1 * | 2/2013 | Gwaltney | ............ | G08B 29/183 340/286.05 |
| 8,384,886 B2 * | 2/2013 | Richardson | ............ | G01K 11/32 356/73.1 |
| 8,400,299 B1 | 3/2013 | Maroney et al. | | |
| 8,401,877 B2 * | 3/2013 | Salvagio | ................ | G06Q 40/08 705/301 |
| 8,401,896 B2 * | 3/2013 | Wargin | .................. | G06Q 10/06 705/4 |
| 8,424,095 B2 * | 4/2013 | Masuoka | ............... | H04L 43/50 726/25 |
| 8,432,117 B2 * | 4/2013 | Berman | .................. | E06B 9/322 318/445 |
| 8,447,631 B2 * | 5/2013 | Ren | ........................ | G06Q 40/08 705/4 |
| 8,599,008 B2 * | 12/2013 | Watson | ................. | H04L 12/2825 340/539.1 |
| 8,649,987 B2 * | 2/2014 | Steenberg | .......... | G05B 23/0235 702/61 |
| 8,749,381 B1 | 6/2014 | Maroney et al. | | |
| 8,760,258 B2 * | 6/2014 | Marriam | ................ | G05B 15/02 340/3.43 |
| 8,924,241 B2 * | 12/2014 | Grosso | ................. | G06Q 10/00 705/4 |
| 9,017,256 B2 * | 4/2015 | Gottesman | .......... | A61B 5/6833 600/300 |
| 9,426,293 B1 * | 8/2016 | Oakes, III | ............. | H04M 3/523 |
| 10,380,692 B1 * | 8/2019 | Parker | .................... | G06Q 40/08 |
| 10,430,887 B1 * | 10/2019 | Parker | .................... | G06Q 40/08 |
| 2002/0010599 A1 * | 1/2002 | Levison | ................ | G06Q 30/02 705/4 |
| 2002/0055861 A1 * | 5/2002 | King | ....................... | G06Q 10/10 705/4 |
| 2002/0095269 A1 * | 7/2002 | Natalini | ............... | H04L 12/2803 702/188 |
| 2002/0128882 A1 * | 9/2002 | Nakagawa | ............ | G06Q 30/02 705/4 |
| 2004/0168086 A1 * | 8/2004 | Young | ................... | G06Q 10/00 726/25 |
| 2005/0267900 A1 * | 12/2005 | Ahmed | ................. | G06Q 10/00 |
| 2006/0033625 A1 * | 2/2006 | Johnson | ............... | G06Q 10/10 340/573.1 |

(56) References Cited

U.S. PATENT DOCUMENTS

| | | | |
|---|---|---|---|
| 2006/0143056 A1* | 6/2006 | Taylor | G06Q 40/08 705/4 |
| 2006/0210753 A1* | 9/2006 | Kadlec | B32B 5/022 428/41.8 |
| 2007/0063075 A1* | 3/2007 | Kaplowitz | A61M 3/022 239/581.1 |
| 2007/0072541 A1* | 3/2007 | Daniels, II | F24F 11/0001 454/365 |
| 2007/0139191 A1* | 6/2007 | Quatro | G06Q 10/08 340/539.13 |
| 2007/0258827 A1* | 11/2007 | Gierke | F04D 15/029 417/6 |
| 2007/0282639 A1* | 12/2007 | Leszuk | G06Q 40/02 705/4 |
| 2008/0015906 A1* | 1/2008 | Fox | G06Q 40/08 705/4 |
| 2008/0055096 A1* | 3/2008 | Aylward | G01W 1/10 340/601 |
| 2008/0058740 A1* | 3/2008 | Sullivan | A61F 13/42 604/361 |
| 2008/0065427 A1* | 3/2008 | Helitzer | G06Q 40/08 705/4 |
| 2008/0234878 A1* | 9/2008 | Joao | B60R 25/102 701/2 |
| 2008/0319786 A1* | 12/2008 | Stivoric | G06Q 30/0242 705/2 |
| 2009/0037230 A1* | 2/2009 | Tracy | G06Q 30/06 705/4 |
| 2009/0157437 A1* | 6/2009 | Becerra | G06Q 10/20 705/4 |
| 2009/0265193 A1* | 10/2009 | Collins | G06Q 30/0185 705/4 |
| 2010/0042442 A1* | 2/2010 | Seitomer | G06Q 40/00 705/4 |
| 2010/0057544 A1* | 3/2010 | Tarbell | G06Q 30/02 705/14.1 |
| 2010/0082174 A1* | 4/2010 | Weaver | H02J 3/14 700/295 |
| 2010/0145734 A1* | 6/2010 | Becerra | G06Q 40/08 705/4 |
| 2010/0153140 A1 | 6/2010 | Helitzer et al. | |
| 2010/0174566 A1 | 7/2010 | Helitzer et al. | |
| 2010/0217642 A1* | 8/2010 | Crubtree | G06Q 10/00 705/7.12 |
| 2010/0225341 A1* | 9/2010 | Burrows | E04D 13/006 324/718 |
| 2010/0228588 A1* | 9/2010 | Nielsen | G06Q 10/06 705/7.11 |
| 2010/0235198 A1* | 9/2010 | Fini | G06Q 10/087 705/4 |
| 2010/0277315 A1* | 11/2010 | Cohn | G08B 29/02 340/540 |
| 2011/0040666 A1* | 2/2011 | Crabtree | G06Q 30/0283 705/37 |
| 2011/0161118 A1* | 6/2011 | Borden | G06Q 40/08 705/4 |
| 2011/0161119 A1* | 6/2011 | Collins | G06Q 40/08 705/4 |
| 2011/0183306 A1* | 7/2011 | Krejcarek | G09B 7/00 434/238 |
| 2011/0191125 A1* | 8/2011 | Patton | G06Q 40/08 705/4 |
| 2011/0217681 A1* | 9/2011 | Krejcarek | G06F 19/3481 434/236 |
| 2011/0251807 A1* | 10/2011 | Rada | G01D 4/00 702/61 |
| 2011/0251868 A1* | 10/2011 | Mikurak | G06Q 10/06 705/7.25 |
| 2011/0270773 A1* | 11/2011 | Siekman | G06Q 10/10 705/305 |
| 2011/0311370 A1* | 12/2011 | Sloss | F04B 47/02 417/1 |
| 2012/0016695 A1* | 1/2012 | Bernard | G06Q 40/08 705/4 |
| 2012/0071731 A1* | 3/2012 | Gottesman | A61B 5/486 600/301 |
| 2012/0101852 A1* | 4/2012 | Albert | G06Q 40/08 705/4 |
| 2012/0109692 A1* | 5/2012 | Collins | G06Q 40/08 705/4 |
| 2012/0123806 A1* | 5/2012 | Schumann, Jr. | G08G 1/096775 705/4 |
| 2012/0173290 A1* | 7/2012 | Collins | G06Q 40/08 705/4 |
| 2012/0188080 A1* | 7/2012 | Haupt | G01W 1/00 340/540 |
| 2012/0209442 A1* | 8/2012 | Ree | H04L 12/2803 700/295 |
| 2012/0223965 A1* | 9/2012 | Pershing | G06F 17/5004 345/630 |
| 2012/0233012 A1* | 9/2012 | Scruton | G06Q 10/10 705/26.4 |
| 2012/0239581 A1* | 9/2012 | Mosher | G06Q 10/10 705/302 |
| 2012/0259666 A1* | 10/2012 | Collopy | G06Q 30/0224 705/4 |
| 2012/0259722 A1* | 10/2012 | Mikurak | G06Q 10/087 705/26.1 |
| 2012/0280814 A1* | 11/2012 | Beale | G01D 9/005 340/540 |
| 2012/0284058 A1* | 11/2012 | Varanasi | G06Q 10/10 705/4 |
| 2012/0310854 A1* | 12/2012 | Cova | G06Q 10/06 705/333 |
| 2012/0330690 A1* | 12/2012 | Goslinga | G06Q 40/00 705/4 |
| 2013/0006676 A1 | 1/2013 | Helitzer et al. | |
| 2013/0020098 A1* | 1/2013 | Bui | A62C 99/0072 169/16 |
| 2013/0024029 A1* | 1/2013 | Tran | A61B 5/1113 700/278 |
| 2013/0030845 A1* | 1/2013 | Brown | G06K 9/0063 705/4 |
| 2013/0055661 A1* | 3/2013 | McGillycuddy | E04D 13/103 52/173.1 |
| 2013/0096954 A1* | 4/2013 | Bodas | G06Q 40/08 705/4 |
| 2013/0103416 A1* | 4/2013 | Amigo | G06Q 40/08 705/2 |
| 2013/0103433 A1* | 4/2013 | Corben | G06Q 40/00 705/4 |
| 2013/0144658 A1* | 6/2013 | Schnabolk | G06Q 40/08 705/4 |
| 2014/0136242 A1* | 5/2014 | Weekes | G06Q 40/08 705/4 |
| 2014/0180725 A1* | 6/2014 | Ton-That | G06Q 10/10 705/4 |
| 2014/0201315 A1* | 7/2014 | Jacob | G08B 25/08 709/217 |
| 2014/0207497 A1* | 7/2014 | Collins | G06Q 40/08 705/4 |
| 2014/0266287 A1* | 9/2014 | Reeder | G01R 1/0408 324/759.01 |
| 2015/0112543 A1* | 4/2015 | Binion | G08G 1/166 701/32.2 |
| 2015/0112545 A1* | 4/2015 | Binion | G07C 5/085 701/33.4 |
| 2015/0112730 A1* | 4/2015 | Binion | G07C 5/008 705/4 |
| 2015/0112731 A1* | 4/2015 | Binion | G06Q 40/08 705/4 |
| 2015/0134369 A1* | 5/2015 | Sakata | G06Q 30/02 705/4 |
| 2015/0161538 A1* | 6/2015 | Matus | G06Q 10/0635 705/4 |
| 2015/0187014 A1* | 7/2015 | Adams | G06Q 40/08 705/4 |

(56) References Cited

U.S. PATENT DOCUMENTS

| | | | | |
|---|---|---|---|---|
| 2015/0208986 A1* | 7/2015 | Gottesman | ............. | A61B 5/486 600/301 |
| 2015/0254781 A1* | 9/2015 | Binion | ................... | G08G 1/166 701/32.2 |
| 2016/0086285 A1* | 3/2016 | Jordan Peters | ........ | G06Q 40/08 705/4 |
| 2016/0171521 A1* | 6/2016 | Ramirez | ............ | G06Q 30/0224 701/409 |
| 2016/0189442 A1* | 6/2016 | Wright | ................... | G07C 5/008 701/33.2 |

FOREIGN PATENT DOCUMENTS

| | | | |
|---|---|---|---|
| AU | 2009201575 | | 11/2012 |
| CA | 2713702 | A1 | 8/2009 |
| CA | 2812395 | A1 | 2/2012 |
| EP | 0368890 | A1 | 5/1990 |
| EP | 1297470 | A1 | 4/2003 |
| EP | 1762845 | A2 | 3/2007 |
| EP | 2116968 | A1 | 11/2009 |
| EP | 2435972 | A1 | 4/2012 |
| WO | 2002035494 | A1 | 5/2002 |
| WO | 2004063855 | A2 | 7/2004 |
| WO | 2009018650 | A1 | 2/2009 |
| WO | 2009114199 | A2 | 9/2009 |
| WO | WO-2009129496 | A2 * | 10/2009 |
| WO | 2010062899 | A1 | 6/2010 |
| WO | 2012063268 | A2 | 5/2012 |
| WO | 2012135325 | A2 | 10/2012 |
| WO | 2013043724 | A1 | 3/2013 |

OTHER PUBLICATIONS

"Extended Vehicle Protection from Assurant Solutions," USAA, dated Jun. 3, 2013. <https://www.usaa.com/inet/pages/extended_vehicle_protection_program_main_page?wa_ref=pubinsmain_EV_LM&aakredirect=true>.

"Hassle-Free Home Security," Scout, dated Jun. 3, 2013. <www.scoutalarm.com>.

"Home Security Systems," Reviews.com, Jun. 3, 2013. <www.reviews.com/home-security-systems/>.

"Professional Alarm Monitoring onl $8.95 a month," Smarthome, Jun. 3, 2013, <www.smarthome.com/alarm.html>.

"Common Questions About Home Insurance," Association of British Insurers, dated Apr. 2012.

"Preventing Costly Water Damage to Your Home and Belongings—Are Water Sensor Systems Right for You?," Allstate, dated Jun. 3, 2013. <www.allstate.com/tools-and-resources/be-aware-and-prepare/water-damage-prevetion.aspx>.

"Protecting Yourself and Your Home with Liberty Mutual," Liberty Mutual Insurance—Home Insurance Coverages, dated Jun. 3, 2013.

"Weather Station Installation Guide", Ambient Weather, downloaded from <www.ambientweather.com/eaofin.html> on Jun. 6, 2013.

"Green Roof Monitoring", HOBO Data Loggers—Onset, downloaded from <www.onsetcomp.com/green-roof-monitoring> on Jun. 6, 2013.

"Everything you should know about smart meters", CitiPower.

"Experts answer tornado questions", USA Today, downloaded from <www.usatoday.com> on Jun. 5, 2013.

"Guidelines for Smart Grid Cyber Security: vol. 2, Privacy and the Smart Grid", The Smart Grid Interoperability Panel—Cyber Security Working Group, Aug. 2010.

"Physical Security", FM 3-19.30, U.S. Department of the Army, Jan. 8, 2001.

"Now Smart Homes Get Smart Discounts", PRNewswire, Dec. 3, 2013.

Sep. 3, 2014—U.S. Non-Final Office Action—U.S. Appl. No. 14/027,539.

Mar. 6 ,2015—U.S. Final Office Action—U.S. Appl. No. 14/027,539.

Sep. 9, 2015—U.S. Non-Final Office Action—U.S. Appl. No. 14/027,539.

Mar. 16, 2016—U.S. Final Office Action—U.S. Appl. No. 14/027,539.

Nov. 17, 2016—U.S. Non-Final Office Action—U.S. Appl. No. 14/186,222.

Dec. 19, 2016—U.S. Non-Final Office Action—U.S. Appl. No. 14/027,539.

Dennis E. Phillips et al., "Supero: A Sensor System for Unsupervised Residential Power Usage Monitoring", Mar. 2013, Department of Computer Science and Engineering, Michigan State University, Advanced Digital Sciences Center and Purdue University, entire document.

Saima Aman et al., "Energy Management Systems: State of the Art and Emerging Trends", Jan. 2013, University of Southern California, entire document.

Mar. 6, 2017—U.S. Final Office Action—U.S. Appl. No. 14/186,222.

Apr. 27, 2017—U.S. Final Office Action—U.S. Appl. No. 14/027,539.

Aug. 17, 2017—U.S. Non-Final Office Action—U.S. Appl. No. 14/186,222.

Feb. 6, 2018—U.S. Final Office Action—U.S. Appl. No. 14/186,222.

Feb. 15, 2018—U.S. Non-Final Office Action—U.S. Appl. No. 14/027,539.

May 30, 2018—U.S. Non-Final Office Action—U.S. Appl. No. 14/186,222.

Sep. 4, 2018—U.S. Final Office Action—U.S. Appl. No. 14/027,539.

Oct. 30, 2018—U.S. Final Office Action—U.S. Appl. No. 14/186,222.

Cassie Peterson, "9 Ways to Make Money with smartHOME Technologies" SDM Magazine http://www.sdmmag.com/articles/89523-ways-to-make-money-with-smarthome-technologies Aug. 1, 2013, pp. 1-10.

Apr. 1, 2019—U.S. Notice of Allowance—U.S. Appl. No. 14/186,187.

Jun. 27, 2019—U.S. Non-Final Office Action—U.S. Appl. No. 14/027,539.

* cited by examiner

HEALTH/LIFE DATA                                           800

NAME: LAST NAME, FIRST NAME — 802

AGE: XX — 804

OVERALL HEALTH STATUS: GOOD ▼ — 806

EXERCISE HABITS: 3X/WEEK ▼ — 808

HEALTHY EATING HABITS: LOW FAT ▼ — 810

CLEAR — 814

HOME DEVICE SENSING

CROSS REFERENCE TO RELATED APPLICATIONS

This application is a continuation of and claims priority to co-pending U.S. patent application Ser. No. 14/186,187 (now U.S. Pat. No. 10,380,692) filed Feb. 21, 2014 and entitled "Home Device Sensing," which is incorporated herein by reference in its entirety.

TECHNICAL FIELD

Aspects of the disclosure generally relate to monitoring and/or sensing of one or more home devices. In particular, various aspects described herein relate to receiving data from one or more sensors associated with one or more home devices and using the data to identify insurance rates or premiums, discounts, incentives, and the like. The data may also be used to alert the user associated with the home device to any issues associated with the device or home infrastructure, thus helping the user to prevent home disasters. The data may also be used to inform the user about home workings in order to help the user better manage their home and/or life.

BACKGROUND

People are often looking for ways to protect their homes. People buy insurance for exactly that reason—to protect against unforeseen risks. However, people are often looking for ways to save money and be more proactive in protecting their assets. In conventional arrangements, it may be difficult or impossible to know when a failure of a home device may occur that may lead to damage to the home, an insurance claim, etc. Further, without accurate information associated with home devices and/or systems, the insurance company might not be able to accurately assess risk associated with the devices and systems of a home. This may result in an insurance rate or premium that is based on a generic risk assessment, rather than a risk assessment tailored to the specific home devices and/or systems within the home being insured.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for receiving data from one or more sensors associated with one or more home devices, such as appliances, home systems, etc. The data may be used to determine whether the home device is operating within an expected range. The data may also be used to determine an insurance rate or premium for a user associated with the home device(s). In some arrangements, the data may be used to determine an age of a home device, as well as a likelihood of failure of that device. This information may be used to determine or adjust insurance premiums or rates and/or provide incentives to users to repair or replace the home device(s).

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 8 is an example user interface for receiving user input related to health or lifestyle data of the user according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
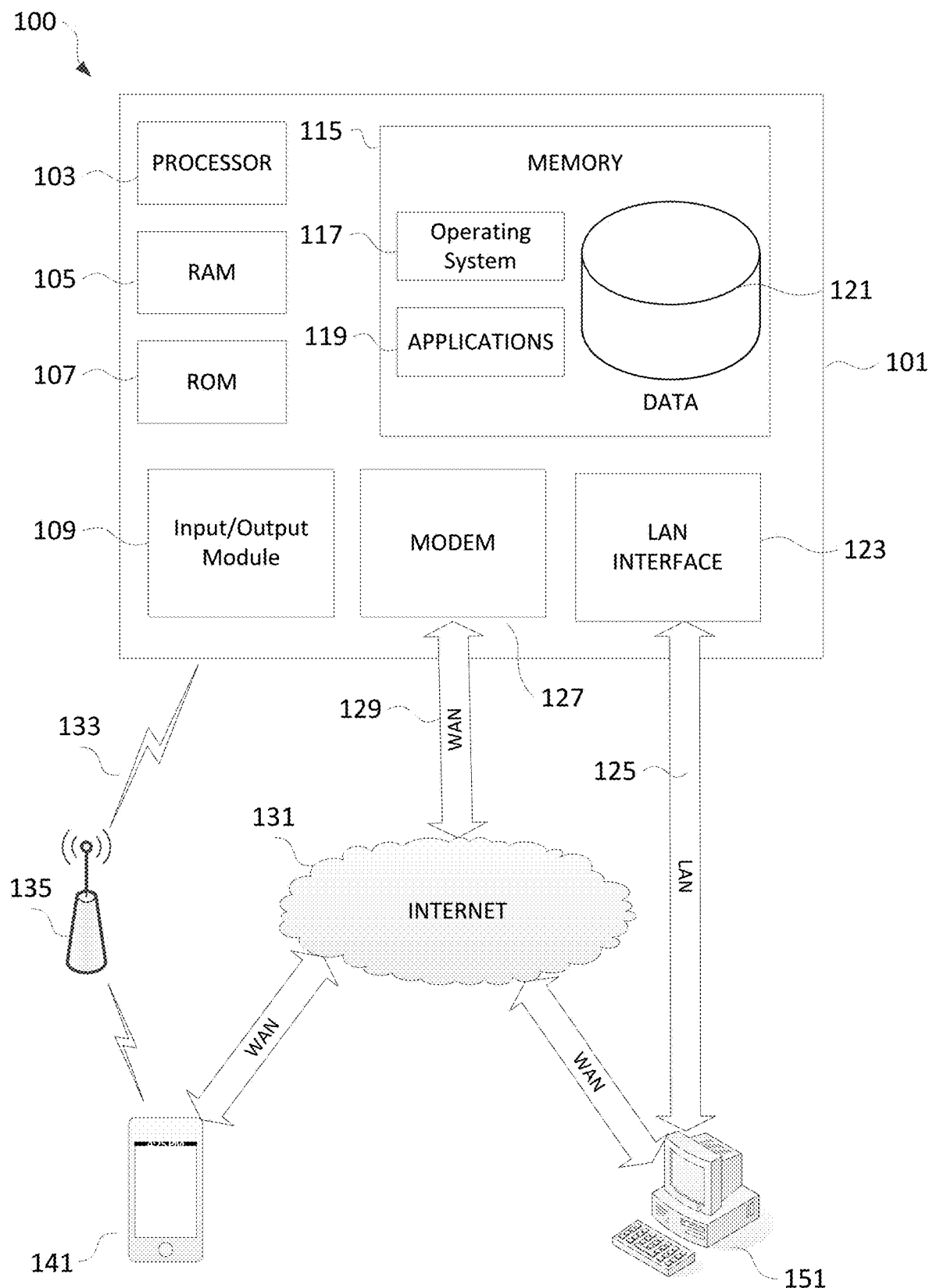
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple sensing or monitoring systems or devices, such as various servers or systems, such as a system or systems for sensing and/or monitoring aspects of one or more home devices, system or systems for sensing and/or monitoring aspects of a vehicle or driving habits, and the like. Such systems may be configured as described herein for receiving data associated with one or more home devices, one or more vehicles, one or more health or lifestyle aspects, etc., to determine whether the operation of these devices is within an acceptable range, identify any potential issues or failures, identify or adjust insurance rates based on the received data, provide insurance incentives for improvement based on the data, etc.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a home device, vehicle, lifestyle aspect, etc., determine one or more aspects of operation of the device and/or one or more overall aspects of a customer's lifestyle and/or provide insurance rates and/or incentives based on the data.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the sensing or monitoring system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the sensing system 101 may include computer-executable instructions (e.g., home device characteristic data analysis, etc.) for receiving data associated with a home device of a user, analyzing the data to determine one or more aspects of the home device, and/or generating insurance rates, adjustments, incentives, etc. based on the data. Additionally or alternatively, one or more application programs 119 used by the sensing system 101 may include computer-executable instructions (e.g. home device, vehicle and/or lifestyle data analysis, etc.) for receiving data associated with one or more aspects of a home device of a user, one or more aspects of a vehicle and/or driving characteristics of the user, and/or one or more aspects of the lifestyle of the user. The data may, in some examples, be used to identify insurance rates, adjustments, incentives, and the like.

The systems described herein may be used by an insurance company, financial institution or other entity to monitor one or more home devices, vehicles, driving characteristics, lifestyle characteristics, etc. of a user. Although many examples herein will be described as being used in conjunction with an insurance company, the systems and methods described herein may be used by or with other entities or types of entities without departing from the invention.

Figure 2A:
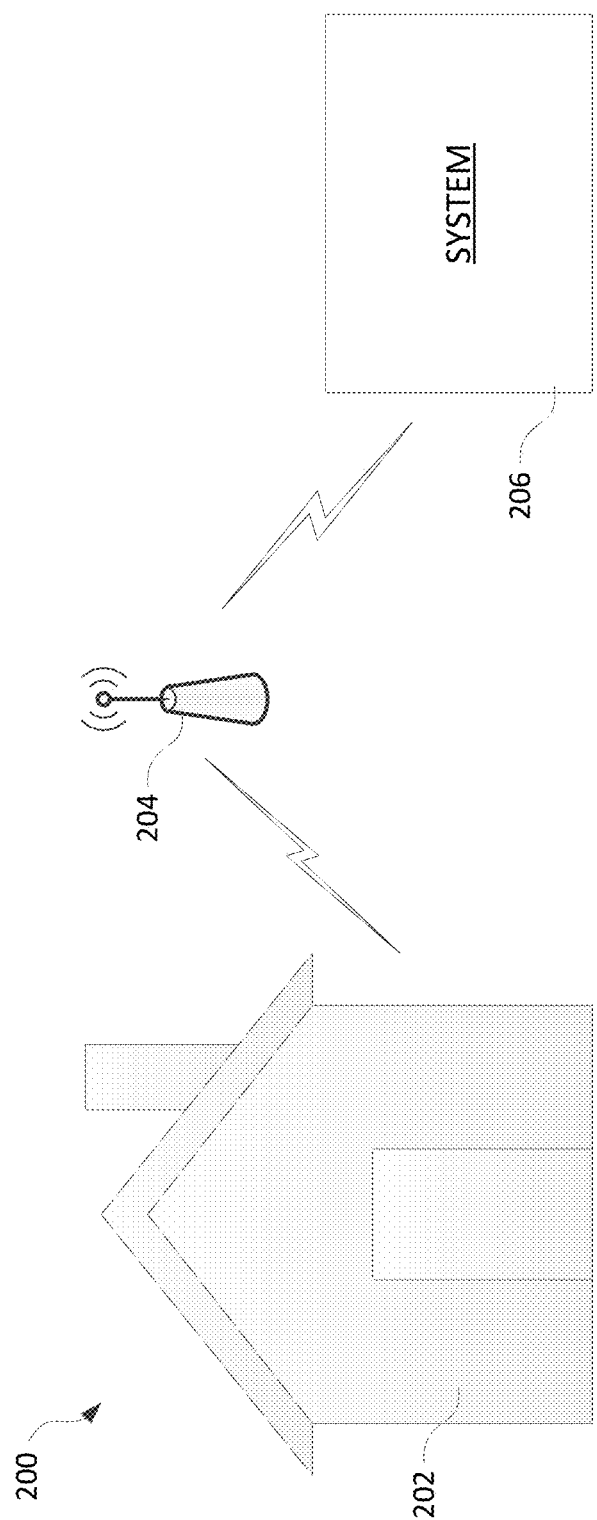
FIG. 2A is a schematic diagram of an example sensing system according to one or more aspects described herein.
Figure 2B:
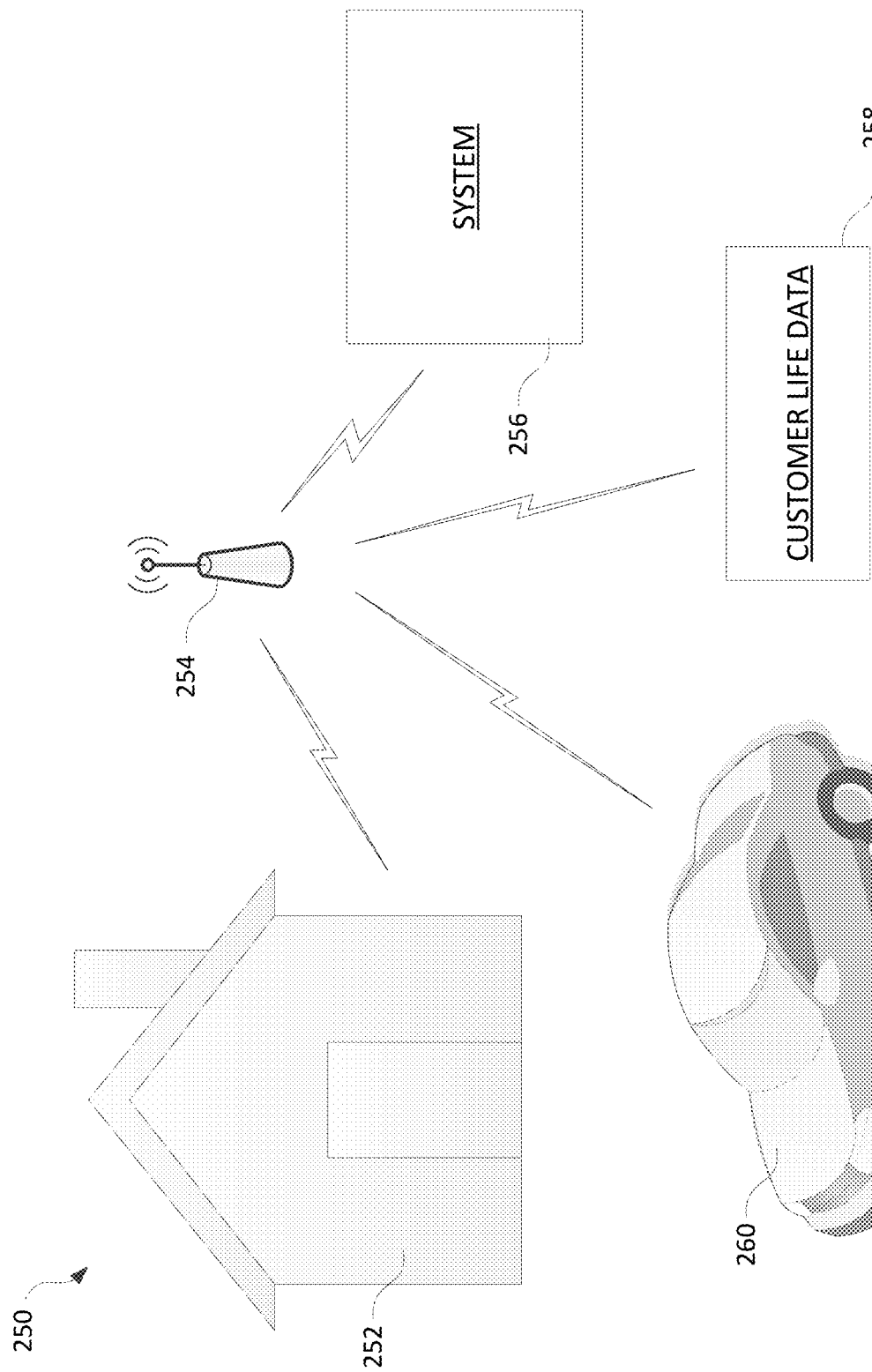
FIG. 2B is a schematic diagram of another example sensing system according to one or more aspects described herein.

In some arrangements, a sensing or monitoring system may be implemented by an entity. In some examples, the entity may be an insurance company. FIGS. 2A and 2B are schematic illustrations of sensing and/or monitoring system arrangements according to one or more aspects described herein. As shown in FIG. 2A, the arrangement 200 may include a home 202. The home 202 may generally include a variety of systems, appliances, etc. that may be monitored by the sensing system described herein. For instance, one or more sensors or sensing devices may be arranged on or integrated into devices such as hot water heaters, refrigerators, washing machines, dryers, furnaces, air conditioning units, and the like. Sensors or sensing devices may also be used to monitor home infrastructure, such as doors, windows, foundation, etc., air quality, and the like. In some examples, sensors or other monitoring devices may be arranged on or integrated into paint, bricks or other building materials, and the like. Other home devices may include sensors or may be monitored without departing from the invention.

In some examples, various types of sensors may be used with the sensing and/or monitoring system. For instance, power sensors, water sensors, heat or smoke sensing devices, moisture sensors, motion sensors, open/close sensors, presence sensors, cameras, and the like, may be used. In still other examples, "smart" materials may be used, such as smart paints, smart bricks, and the like, that may provide indications of wear or potential failure. In still other examples, sensors may be used to monitor utilities (e.g., water, gas, electric).

The home 202 depicted in FIG. 2A may include a plurality of appliances and/or systems, and one or more of the appliances and/or systems (e.g., devices) may be monitored by one or more sensing devices, as will be described more fully below. Signals from the one or more sensing devices may be transmitted to the sensing system 206 at an entity, such as an insurance company. In some examples, the signals may be wirelessly transmitted and may be transmitted to a base collection unit 204 prior to transmission to the system 206. Alternatively, the signals may be transmitted directly to the system 206, e.g., via wired or wireless means. In some arrangements, the data may be collected in real-time and/or transmitted in real-time or near real-time. Additionally or alternatively, the data may be collected and/or transmitted in batches.

FIG. 2B illustrates another example sensing arrangement 250. Similar to the arrangement of FIG. 2A, the arrangement 250 of FIG. 2B includes a home 252 that may include a plurality of appliances and/or systems that may be monitored by one or more sensing devices. In addition, the arrangement 252 may include one or more vehicles, such as vehicle 260. The vehicle 260 may include one or more sensing devices configured to monitor driving habits of a user. The data associated with the vehicle 260 may be transmitted to a sensing system 256, e.g., via wired or wireless communications.

For instance, a vehicle, such as an automobile, motorcycle, boat, or other vehicle, may include vehicle operation sensors capable of detecting and recording various conditions at the vehicle and operational parameters of the vehicle. For example, sensors may detect and store data corresponding to the vehicle's speed, distances driven, rates of acceleration or braking, and specific instances of sudden acceleration, braking, and swerving. Sensors also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors may detect and store the external driving conditions, for example, external temperature, rain, snow, light levels, and sun position for driver visibility. Sensors also may detect and store data relating to moving violations and the observance of traffic signals and signs by the vehicle. Additional sensors may detect and store data relating to the maintenance of the vehicle, such as the engine status, oil level, engine coolant temperature, odometer reading, the level of fuel in the fuel tank, engine revolutions per minute (RPMs), and/or tire pressure.

The vehicle also may include one or more cameras and proximity sensors capable of recording additional conditions inside or outside of the vehicle. Internal cameras may detect conditions such as the number of the passengers in the vehicle, and potential sources of driver distraction within the vehicle (e.g., pets, phone usage, unsecured objects in the vehicle). External cameras and proximity sensors may detect other nearby vehicles, traffic levels, road conditions, traffic obstructions, animals, cyclists, pedestrians, and other conditions that may factor into a driving event data analysis.

The operational sensors and the cameras and proximity sensors may store data within the vehicle, and/or may transmit the data to one or more external computer systems (e.g., a sensing system 300 in FIG. 3), as will be discussed more fully below.

In some examples, the arrangement 250 may further include customer health or lifestyle data 258. Customer health/lifestyle data 258 may include a database storing various information related to a customer's lifestyle, eating habits, exercise habits, general health, and the like. The customer health/lifestyle data 258 may be provided by the user and/or may be collected from one or more outside sources (e.g., social media, health club records, etc.). In some examples, a user may track eating habits, exercise habits, and the like via an application, such as an application on a mobile device, and that information may then be transmitted to the sensing system 256.

The data transmitted to the sensing system 256 may be aggregated and some or all of the portions of the data may be used to identify and/or adjust insurance premiums or rates, provide insurance incentives, and/or provide discounts to the user. For instance, a user may be eligible for a discounted insurance premium if the user is willing to share the monitored or collected data with an entity, such as an insurance company. This data may then be used to modify or set insurance premiums or rates for the user (e.g., home insurance, vehicle insurance, life insurance, health insurance, and the like) and/or to more accurately assess risk associated with a user. Additionally or alternatively, the data collected may be aggregated with other data (e.g., historical data collected over many years, other user monitored data, etc.) to further assess risk and/or set premiums or rates. The aggregated data may, in some examples, be sorted by locality (e.g., neighborhood, township, state, etc.) to assess risk by geographic location and set or adjust premiums or rates based on geographic location, as desired.

The arrangements 200, 250 described in FIGS. 2A and 2B are merely schematic examples of some arrangement systems. The data transmissions may be made from various types of sensors monitoring one or more types of devices or systems without departing from the invention. Further, any data transmission may be made via wired or wireless connection and/or may be made to a base collection unit 204, 254 or directly to a system 206, 256, such as a sensing system used by an entity (e.g., an insurance provider). The collected data may be used or aggregated (e.g., with other data from a same or similar device and/or with data from other devices) to determine or adjust an insurance premium or rate, identify one or more characteristics or features of the devices being monitored (e.g., age, condition, etc.), provide incentives or discounts to users, and the like. Various uses of the collected data will be discussed more fully below.

Figure 3:
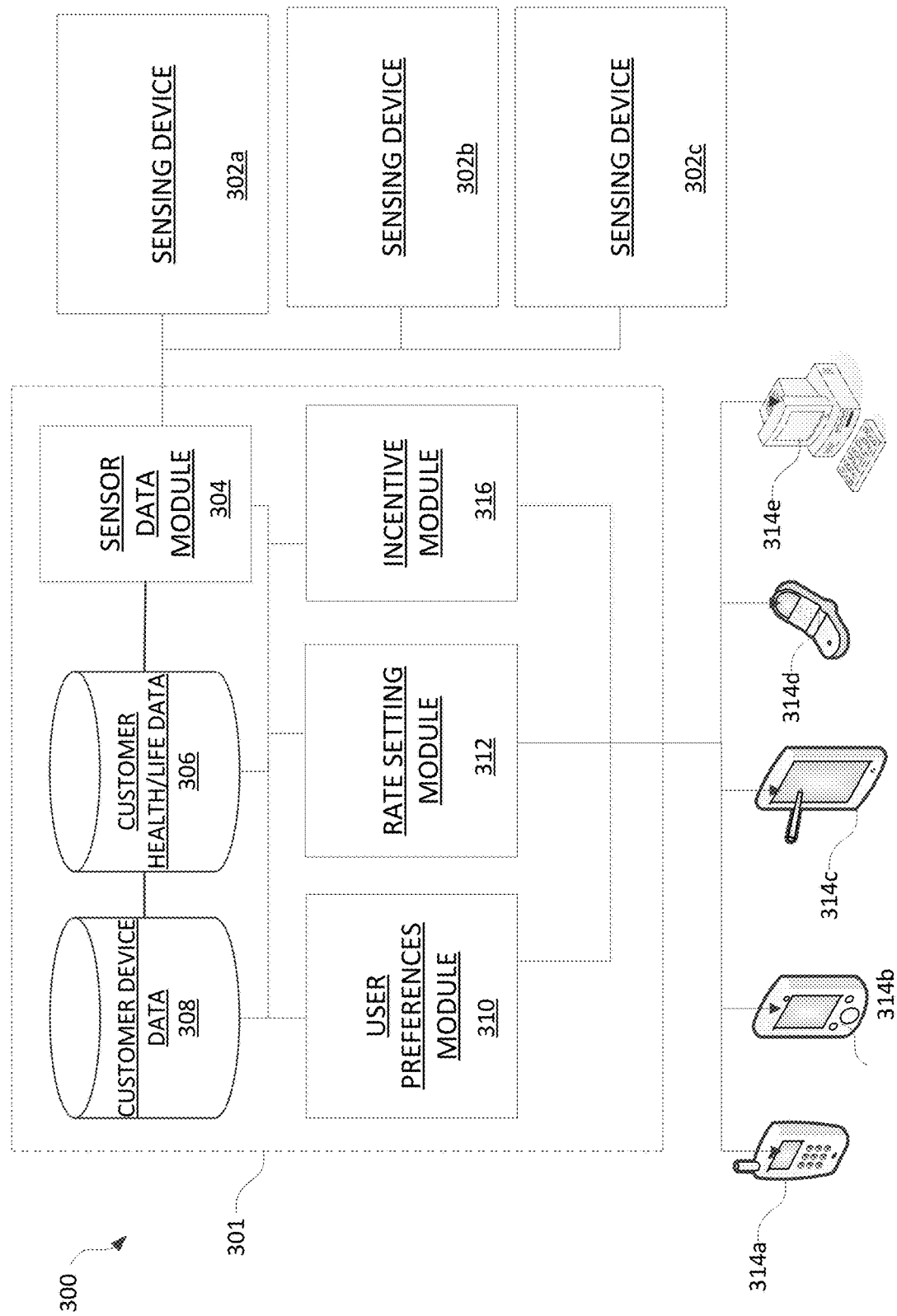
FIG. 3 is an example sensing system according to one or more aspects described herein.

FIG. 3 illustrates one example sensing system 300. Each component shown in FIG. 3 may be implemented in hardware, software or a combination of the two. Additionally, each component of the sensing system may include a computing device (or system) having some or all of the structural components described above for computing device 101. In some arrangements, some or all of the components of system 300 may be housed in a single physical device. Alternatively, some or all of the components may be housed in separate physical devices.

The sensing system 300 may be associated with an entity 301. For instance, the system 300 may be implemented by an entity 301, such as an insurance company. In other examples, the system 300 may be implemented by various other types of companies, universities, government entities, and the like. Several examples discussed herein will be described in the context of an insurance company. However, nothing in the disclosure should be viewed as limiting the systems, methods, computer-readable media, and the like, described herein to use with insurance companies.

The sensing system 300 may include a plurality of sensing devices 302a-302c. The sensing devices 302a-302c may be a variety of types of devices and may be used to monitor or sense one or more characteristics of a home device, such as an appliance, system, etc., vehicle, and the like. For instance, the sensing devices 302a-302c may include power sensors, float switches, moisture sensors, power sensors or monitors, wear indicating devices, speed sensors, and the like. In other examples, the sensing devices 302a-302c may include devices for sensing temperature, sewage backup, natural gas, propane, etc., air quality (e.g., carbon monoxide, etc.), air flow quality, water flow, motion, mold, smoke, electrical shorts, and the like. Various other types of sensing devices and/or characteristics may be monitored via sensing devices 302a-302c.

In some arrangements, one or more of sensing devices 302a-302c may be integrated into, connected with or in communication with one or more home devices, such as appliances, systems, etc., to monitor one or more characteristics of the home device. For instance, home devices or systems such as a water heater, sump pump, roof, attic (e.g., air flow in attic), washing machine, dryer, refrigerator, freezer, air conditioner, furnace, and the like, may be monitored. Various other appliances and/or systems may be monitored without departing from the invention.

In some examples, one or more of sensing devices 302a-302c may be connected to or in communication with systems of a vehicle. For instance, one or more of the sensing devices 302a-302c may be configured to monitor driving habits of a user, such as driving speed, acceleration, braking, and the like. Data may be transmitted from the sensors connected to the vehicle to the sensing system (e.g., system 206 or 256) to be used to determine and/or adjust insurance rates or premiums, assess risk, and the like. In some examples, the vehicle data may be aggregated with home sensing data received from one or more of sensing devices 302a-302c to further assess risk, set rates, etc.

Although the sensing system 300 includes three sensing devices 302a-302c, the system 300 may include more or fewer sensing devices without departing from the invention. Further, in some examples, each sensing device may be a different type of device and/or may be configured to monitor different characteristics of the home device (e.g., sensing device 302a detects moisture while sensing device 302b detects power consumption) or vehicle. Additionally or alternatively, each sensing device 302a-302c may be connected to or in communication with a different home device or vehicle, or multiple sensing devices 302a-302b may be connected to or in communication with a single home device or vehicle such that multiple, different characteristics of the home device or vehicle are being monitored (e.g., simultaneously). This may permit additional and/or more accurate information to be collected about the home device. Various combinations of the above-described arrangements may also be used without departing from the invention.

Signals and/or data from the sensing devices 302a-302c may be received by the sensing system 300. For instance, signals and/or data may be transmitted from the sensing devices 302a-302c to the system 300 via wired or wireless transmission. In some examples, the data and/or signals may be transmitted to a base unit for collection prior to transmission to the system 300 or entity 301 associated with the system. In other examples, the data and/or signals may be transmitted directly from each sensor 302 to the system 300 or entity 301.

The signals and/or data from the sensing devices 302a-302c may be received by a sensor data module 304. The sensor data module 304 may include one or more computing devices containing many or all of the hardware and/or software components of the computing device 101 in FIG. 1. The sensor data module 304 may include hardware, software and/or network components configured to receive and/or transmit information to and/or from various computing devices, modules, databases, sensors, and the like.

The sensor data module 304 may be configured to perform a set of functions within the sensing system 300. For instance, the sensor data module 304 may collect data and/or signals received from one or more sensing devices 302a-302c and may include one or more algorithms which may be executed by one or more software applications running on generic or specialized hardware within the sensing system 300 to determine whether data is within a predefined range. For instance, the sensor data module 304 may identify signals or data that are outside a predefined range (e.g., a normal or typical operating range) and, responsive to determining that the data is outside the predefined range, transmit an alert to a user identifying the potential issue. In some examples, the predefined range may be set, such as by a system administrator. In other examples, the predefined range may be based on historical data of the user or similar devices being monitored. In some examples, the historical data may be stored in a database, such as customer device database 308, as will be discussed more fully below.

In some arrangements, the sensor data module 304 may aggregate data received from sensing devices 302a-302c for later use, as will be discussed more fully below.

Data received from sensors 302a-302c may be stored in customer device database 308. The customer device database may be organized in any of several different manners. For example, a table in the customer device database 308 may include a listing of various users, home devices associated with each user, historical data of the home devices, current or recent weather data, historical weather data, vehicle and/or driving data of the users, geographic location of users, and the like.

In some examples, customer device database 308 may also include historical data collected from users without the use of sensors. For example, the customer device database 308 may include information provided by users, such as information associated with appliances, vehicles, home systems, etc. For instance, upon purchase of an appliance (e.g., stove, refrigerator, water heater, etc.) a user may provide information regarding the manufacturer, model, serial number, year of purchase or manufacture, amount paid, etc. for the appliance. Accordingly, as users add information for each appliance, system or vehicle, a catalog of device information may be maintained by the customer device database 308. This catalog of information may be used to track the age of appliances, systems, vehicles, etc., determine or assess risk associated with those appliances, systems or vehicles, identify opportunities for improvement (e.g., energy efficiency improvements), and the like.

In some examples, a radio frequency identifier (RFID), quick response (QR) code, bar code, or other data element may be applied to the appliance, system or vehicle to simplify tracking and/or identification of the appliance. For instance, if a repair is made to an appliance, the repair information may be provided to the system and may be input to the system by scanning the QR code, bar code, etc. and updating the information associated with that appliance, system or vehicle. The information may also be used to determine or aid in determining household inventory in cases of flood, fire, or other catastrophe.

The information stored in the customer device database 308 may also be used to alert users of recalls associated with one or more appliances, systems or vehicles within the system. For instance, recall information may be transmitted to the system 300 from one or more external systems (e.g., device or manufacturer systems), and the system 300 may identify any devices matching the recall information and may transmit an alert to the user(s) associated with that device.

In still other examples, customer device database 308 may include historical customer information gathered from clients without the use of sensors. For instance, historical data from customers regarding incidents or damage to the home, appliances, system, vehicle, etc. may be obtained, such as from previous insurance claim information, and stored to further aid in assessing risk and setting or adjusting insurance rates or premiums.

The sensing system 300 may further include customer health/life data 306. Customer health/life data may be received from the customer or user and may include information regarding the general health and/or lifestyle of the user. For instance, it may include eating habits of the user (e.g., healthy or unhealthy eating habits), exercise habits of the user, general wellness information (e.g., whether the user visits the doctor on at least an annual basis, etc.). The information may be received by the system via one or more computing devices, such as computing devices 314a-314e. For instance, a user may input health and/or life data via a smart phone 314a, personal digital assistant (PDA) 314b, tablet computer 314c, cell phone 314d or computer terminal 314e. Various other types of computing devices may be used without departing from the invention. In some examples, data may be stored in a mobile device application and transmitted from the application to the system 300. In still other examples, some data, such as exercise data, may be collected via one or more sensors (e.g., accelerometers, pedometers, heart rate monitors, etc.) that are connected to the system. For instance, a user may have a device that monitors pace, speed, heart rate, and the like. This information may be uploaded from the user device to the system for use in determining and/or adjusting insurance rates or premiums, assessing risk associated with the user, and the like.

The sensing system 300 may further include a user preferences module 310. The user preferences module 310 may be implemented in hardware and/or software configured to perform a set of functions within the sensing system 300. For instance, the user preferences module 310 may receive and/or store one or more customer or user preferences associated with the sensing devices 302a-302c and/or the system in general. For example, a user may monitor one or more systems, appliances, vehicles, etc. However, the user may desire to only transmit a portion of the collected data to the system. Accordingly, a user may set up a user preference identifying the devices, appliances, systems and/or vehicles for which the system may monitor and/or receive data. Thus, a user may desire to only provide data associated with one or more home systems and not provide data associated with life or vehicle. In another example, a user may desire to provide all of the home device data, vehicle data, health/lifestyle data. Various other examples and combinations may be used without departing from the invention. In some examples, the entity may provide additional incentives, discounts, etc. based on the number of devices and/or data sets being received by the entity. For instance, if a user's preferences indicate that all device data may be transmitted to the entity, that user may receive more incentives and/or discounts than a user providing only a portion of the collected data.

The sensing system 300 may further include a rate setting module 312. The rate setting module 312 may be implemented in hardware and/or software configured to perform a set of functions within the sensing system 300. For instance, the rate setting module 312 may determine and/or adjust insurance rates or premiums based on the data collected by or stored within the system 300. The rate setting module 312 may analyze the data to assess risk associated with one or more users, devices, geographic areas, etc. and may use that information to provide insurance adjustments or determine rates or premiums for users that may include customers or potential customers of the entity (e.g., the insurance company). In some examples, the rate setting module 312 may be in communication with or connected to other systems associated with the entity to aid in assessing risk, determining rates, etc.

The sensing system 300 may further include an incentive module 316. The incentive module may be implemented in hardware and/or software configured to perform a set of functions within the sensing system 300. For instance, the incentive module 316 may identify one or more rebates, discounts, incentives, etc. to provide to a user based on the data collected by or stored within the system 300. For instance, if the collected data indicates that a water heater is likely to fail (e.g., based on an age of the water heater, detected corrosion within the water heater, etc.) the system may generate an incentive for the user to replace the water heater. For instance, the system may identify a 5% discount on homeowners insurance for the user if the water heater is replaced within a predetermined period of time.

In another example, sensor data may indicate that a rupture of a water line connected to a refrigerator is likely. Accordingly, the system may identify an incentive for the user to repair/replace the water line, replace the refrigerator, etc.

In yet another example, an incentive may be generated for the user based on a modification of driving habits, lifestyle habits, etc. For instance, if the sensor data received from a vehicle associated with the user indicates unsafe driving habits (e.g., not wearing a seat belt, speeding, use of a phone while driving, etc.) an incentive may be generated and offered to the user to receive a discount, rebate, rate adjustment, etc. based on changes to those driving habits. Additionally or alternatively, a user with health/lifestyle data indicating a relatively unhealthy lifestyle (e.g., little or no exercise, poor eating habits, etc.) may receive an incentive to improve those lifestyle habits.

The above examples of incentives are merely some example incentives that may be generated and/or provided by the system. Various other examples, of incentives may be used without departing from the invention.

Figure 4:
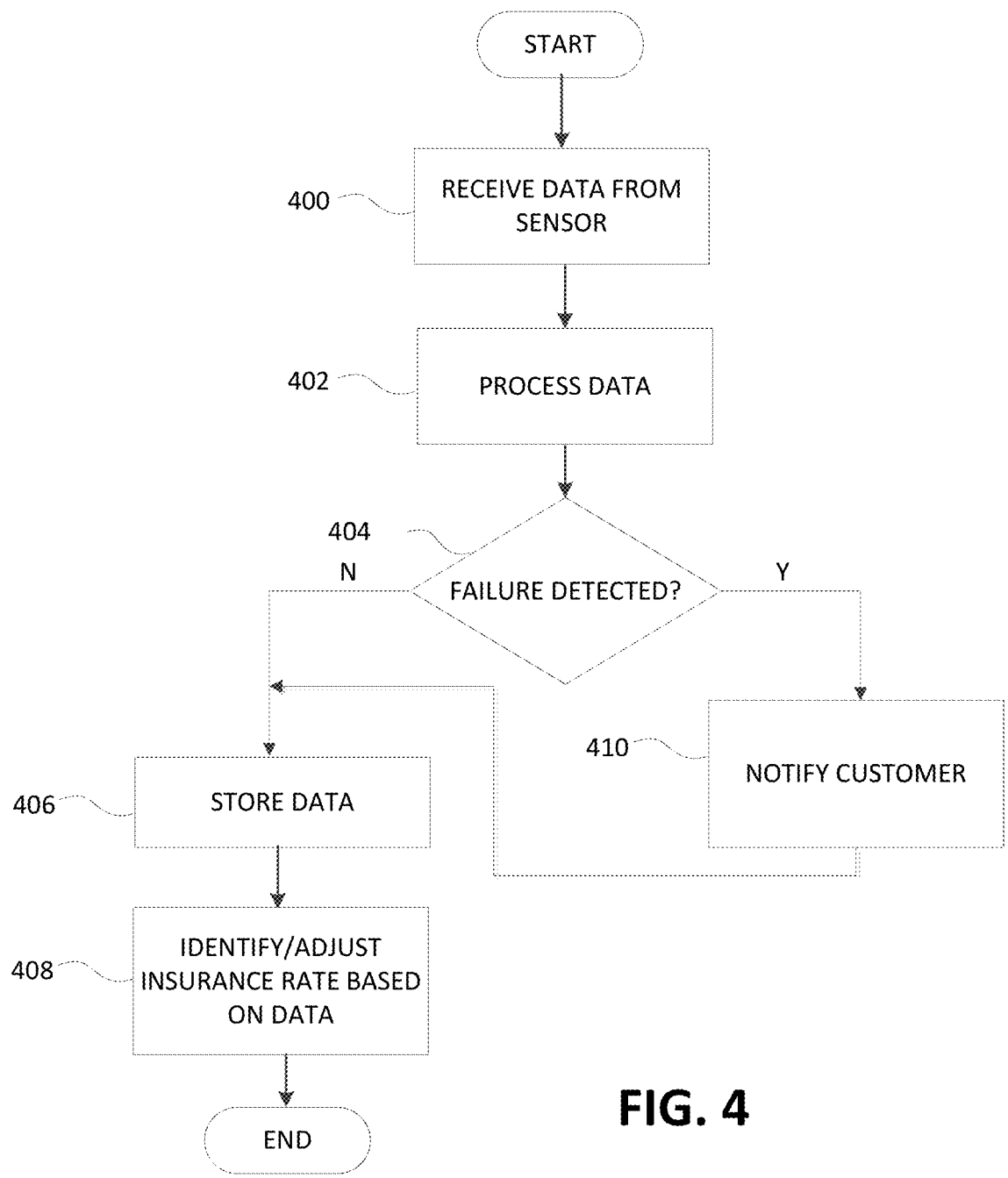
FIG. 4 is a flow chart illustrating one example method of implementing a sensing system according to one or more aspects described herein.

FIG. 4 illustrates one example method of implementing a sensing system according to one or more aspects described herein. In step 400, data is received from a sensor. In some examples, data may be received from a plurality of sensors. The plurality of sensors may be associated with one home device or with a plurality of home devices. In step 402, the data is processed to determine whether the received data is outside of a predefined threshold. For instance, a determination may be made as to whether the received data indicates that the device is operating outside of a typical range of data.

In step 404, a determination is made as to whether a failure is detected. Detection of a failure may include a decrease in performance (e.g., sensor data indicates device is operating outside of the predefined or normal range), failure of a portion of a device (e.g., water line on refrigerator but not failure of entire refrigerator), or failure of an entire device (e.g., temperature or moisture sensor indicates water heater has failed). If a failure is detected (e.g., based on the received/processed sensor data) in step 404, the customer or user associated with the device may be notified in step 410. For instance, a notification may be sent via email, phone, SMS, and the like. The notification may be sent to a computing device of the user, such as a mobile device or user interface arranged in a vehicle.

If, in step 404, a determination is made that the data does not indicate a failure, or after the notification has been sent to the user, the data received from the sensor may be stored in step 406. For example, the data may be stored in a database, such as customer device database 308 in FIG. 3. In step 408, the received data (and, in some instances, other data) may be used to set or adjust one or more insurance rates or premiums. For instance, the received data may be used to more accurately assess risk associated with a home device or household in general, and may be used to adjust or determine an insurance rate or premium based on this assessed risk. As discussed above, the more devices being monitored by the sensing system, the more accurately the risk may be assessed and thus the insurance rate or premium may be adjusted accordingly.

Further, as information from one or more devices or monitors is collected, the data may be aggregated to determine risk. The aggregate data may indicate that risks are reduced by having certain types of sensors or monitoring devices in the home. Accordingly, discounts, rebates, rate reductions, etc. may be offered to homeowners using the devices to continue use of the devices. Also, discounts, rebates, rate reductions, etc. may be offered to other homeowners or customers who currently are not using the devices, as an incentive to install the devices/monitoring system.

Figure 5:
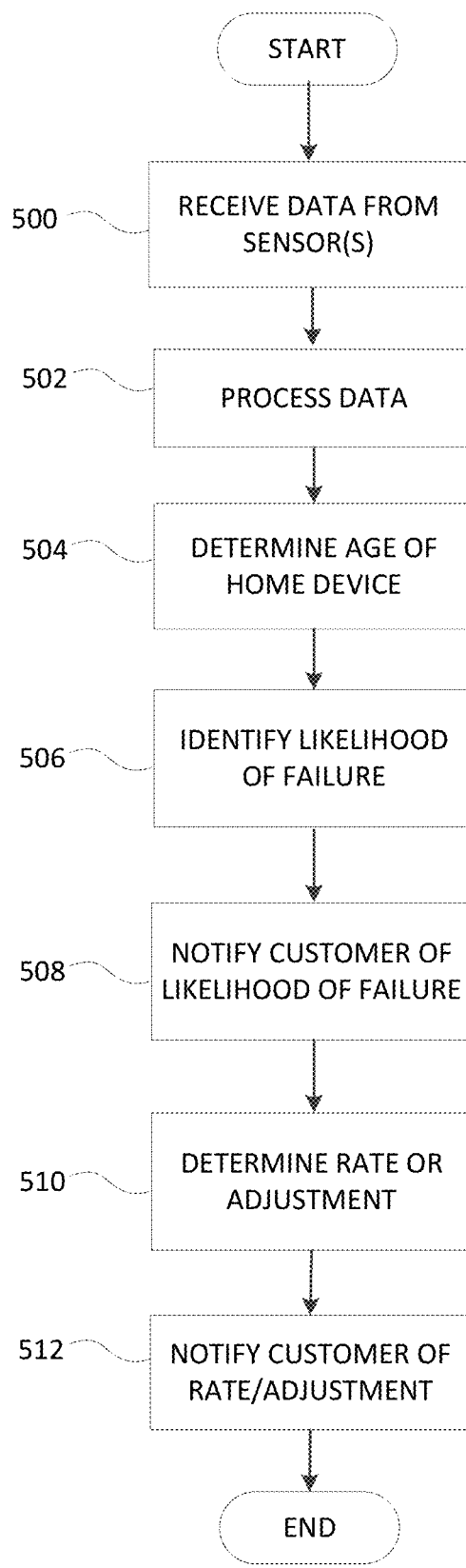
FIG. 5 is a flow chart illustrating another example method of implementing a sensing system according to one or more aspects described herein.

FIG. 5 illustrates another example implementation of a sensing system according to one or more aspects described herein. In step 500, data may be received from one or more sensors. For instance, data may be received from a plurality of sensors associated with one home device or from sensors associated with a plurality of home devices. In step 502, the received data may be processed to extract information that may be used in additional analysis and/or determinations. For instance, the data may be processed to determine an age of the home device in step 504. For example, one or more levels of wear may be detected by the sensors and may be transmitted to the system. The system may then determine an approximate age of the home device. In some examples, the age may be indicative of the actual years the home device has been in use. Additionally or alternatively, the determined age may be an approximate number of years based on operational data received from sensors (e.g., estimated age based on the performance of the device which may or may not be the same as the actual age of the device).

In some examples, as discussed above, a system may maintain information associated with the manufacturer, model, serial number, etc. of various home devices. In some arrangements, the system may use this information, in conjunction with received sensor data, to determine an age of the home device.

In step 506, the data and the determined age of the device may be used to determine a likelihood of failure of the device or one or more portions of the device. For instance, the determined age may be compared with known failure rates (e.g., based on publicly available data, data collected by the entity from other failures or insurance claims filed, and the like) to determine a likelihood of failure.

In some examples, the likelihood of failure may also be based on the type (e.g., make and/or model) of the device. For instance, if a user has provided information to the entity or insurance company regarding the make, model, etc. of the device (e.g., for cataloging or tracking purposes as discussed above), that information may be used to identify known failures or deficiencies in that particular product, which may aid in more accurately determining the likelihood of failure.

The determined likelihood of failure may then be transmitted to a user or customer associated with the device in step 508. For instance, an email, SMS message, etc. may be transmitted to the user indicating that the received data indicates a potential failure. In some examples, the user may be prompted to take additional action (e.g., work with the insurance company or entity to repair or replace the device).

In step 510, an insurance rate for the user or customer associated with the device, or an adjusted rate, based on the received data, determined age of the device and determined likelihood of failure may be determined. For instance, if the received data indicates that a device is relatively new, is operating within normal parameters, etc. the determined likelihood of failure is likely to be low and the user may get a reduced insurance premium or may receive a discount or rebate. Alternatively, if the data indicates that the device is relatively old and is likely to fail (e.g., in the next 6 months, 12 months, 18 months, etc.) then the rate for the user may increase due to the increased potential risk of failure of the device that may lead to an insurance claim.

In some arrangements, the users may be notified of the potential rate or adjustment prior to the rate or adjustment taking effect, as indicated in step 512. The user may then have an opportunity to take action in order to further adjust the rate. For instance, the user may replace the device likely to fail in order to avoid an increase in insurance premium.

In some examples, the user may be provided with a time limit in which to take action prior to the rate or adjustment going into effect. For instance, the user may be notified that if the device is not repaired or replaced within, for example, 30 days, 60 days, etc., the new or adjusted rate will go into effect. In some arrangements, upon replacement of the device, the entity may hold the adjustment of the rate until sufficient data is collected to determine that the device has been replaced and is functioning within an acceptable range. This may provide additional security to the insurance company to avoid fraudulent indications of replacement of devices.

Figure 6:
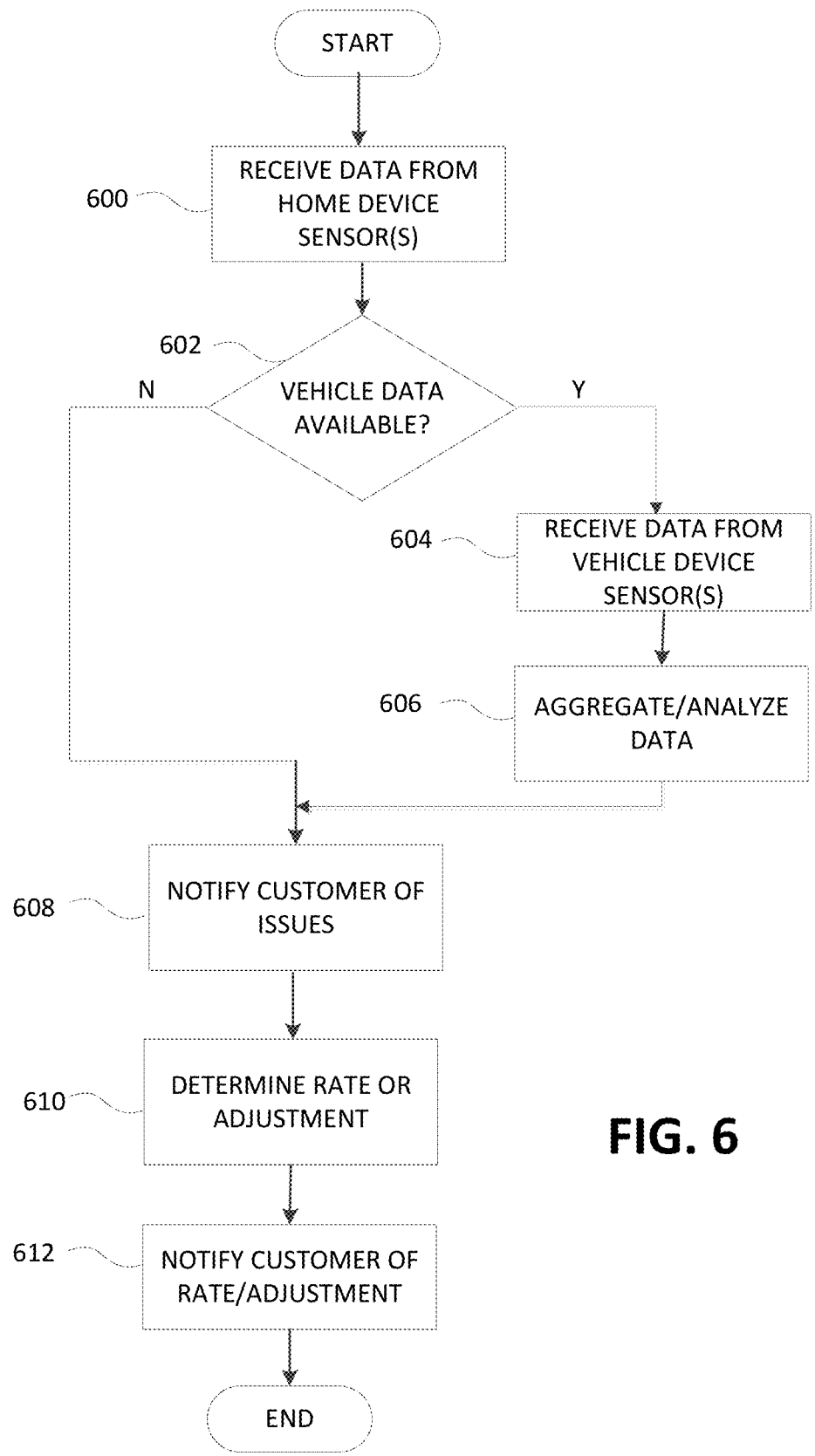
FIG. 6 is a flow chart illustrating yet another example method of implementing a sensing system according to one or more aspects described herein.

FIG. 6 illustrates another example implementation of a sensing system according to one or more aspects described herein. In step 600, data is received from one or more sensing devices associated with a home device. The data may be received from multiple sensors and/or multiple devices. In step 602, a determination is made as to whether vehicle data associated with the user is available. For instance, the determination may include whether the user is monitoring vehicle data, whether the user's preferences allow access to the vehicle data, and the like. If, in step 602, vehicle data is not available, any issues identified in the home data may be transmitted to the user in step 608. For instance, a notification may be sent to a user that one or more home devices are operating outside of a predefined or normal threshold.

In step 610, the received home device data may be used to determine an insurance rate or premium, or adjustment to a rate, for the user. For instance, the insurance company or entity may use the data to assess risk associated with the home device(s), home in general, etc., to determine an appropriate insurance rate for the user. In step 612, the insurance rate or adjustment may be communicated to the user. In some examples, notifying the user of the new rate or adjustment may include an option to obtain a discount if action is taken regarding home devices detected as being old, not operating properly, etc. In some examples, if the new rate or adjustment would result in an increase in costs for the user, the user may be given an option to repair or replace one or more home devices before the rate or adjustment takes effect. If the repair or replacement is completed, the user might not be subject to the rate increase.

If, in step 602, vehicle data is available and accessible by the system (e.g., based on user preferences), then the vehicle data may be received from one or more sensors associated with a vehicle in step 604. In step 606, the data from the home device(s) and vehicle(s) may be aggregated and analyzed to more accurately assess or determine risk, set rates, etc. The process may then continue at step 608 in which the system may notify a user of any detected issues with one or more home devices or with the vehicle associated with the vehicle data. In step 610, the rate or adjustment may be do homeowners insurance, renters insurance, etc. based on the home device data and/or to automotive insurance based on the vehicle data received. In step 612, the customer may be notified of any potential adjustments to the rate.

Figure 7:
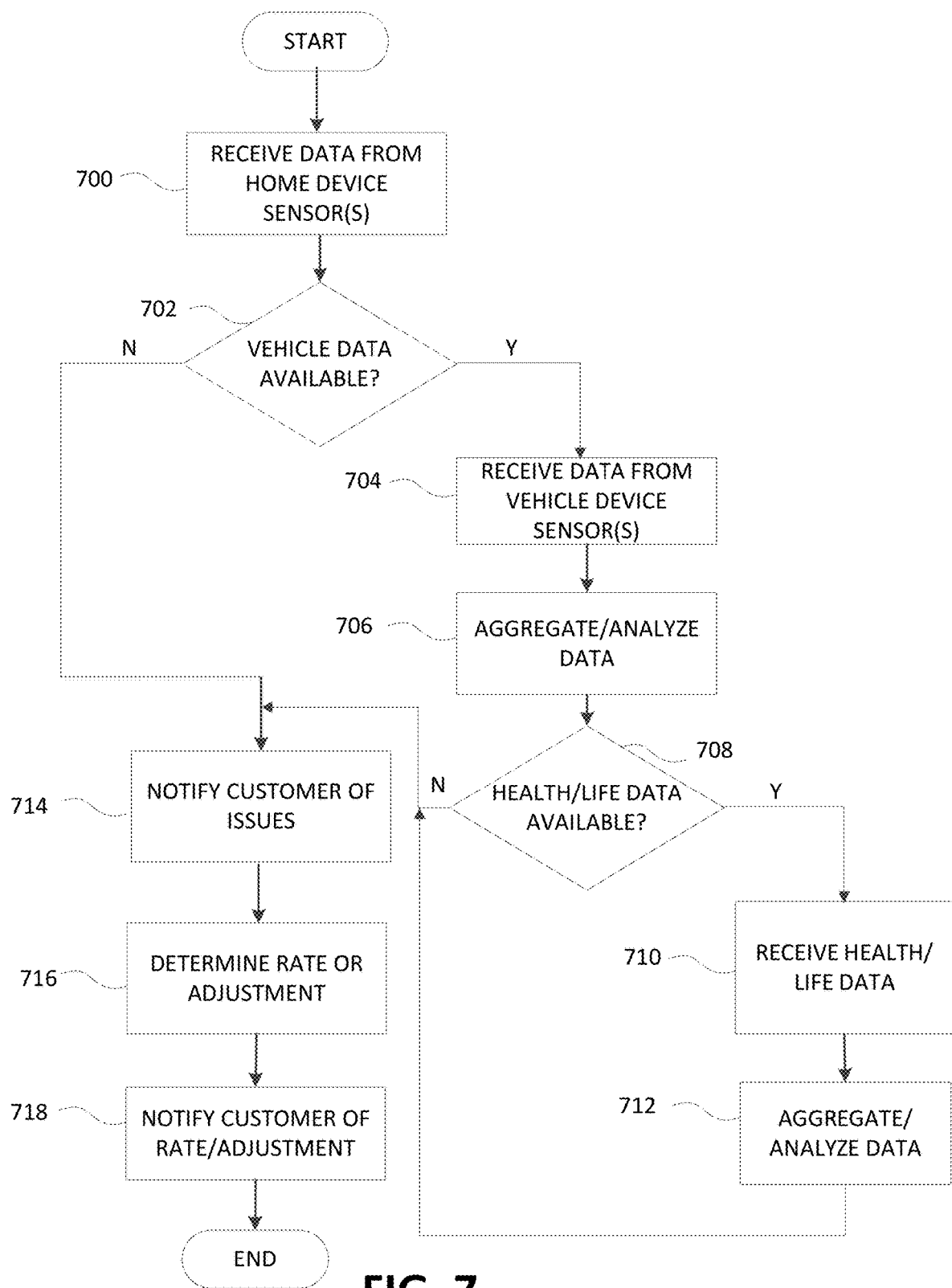
FIG. 7 is a flow chart illustrating still another example method of implementing a sensing system according to one or more aspects described herein.

FIG. 7 illustrates yet another example method of implementing a sensing system according to one or more aspects described herein. Similar to the method illustrated in FIG. 6, in step 700, device data may be received from one or more home devices. In step 702, a determination may be made as to whether vehicle data is accessible by the system. If vehicle data is not available or accessible, the system may notify the customer of any issues detected from the data associated with the home devices in step 714. In step 716, an insurance rate or adjustment may be determined based on the home device data. In step 718, the rate or adjustment may be transmitted to the user.

If, in step 702, vehicle data is available and accessible (e.g., as identified in a user's preferences) vehicle sensor data may be received in step 704. In step 706, the data may be aggregated and/or analyzed with the home device data to determine or assess risk, set rates, etc. For instance, a risk score may be calculated based on home device data (e.g., home maintenance information, lack of maintenance, etc.) and vehicle data (e.g., fast turns, quick stops, quick acceleration, and the like). The risk score may be calculated using a variety of methods and may indicate a risk associated with the user based on the data collected from the home devices and vehicle. This risk score may then be used to predict home losses and/or auto losses. For instance, in situations where individual behaviors may contribute to potential home or auto losses (e.g., theft, liability, etc.), the risk score may aid in determining a likelihood of loss or damage.

In step 708, a determination may be made as to whether health and/or life data associated with the user is available to and accessible by the system. If health/life data is not available or accessible, the process moves to step 714 in which any issues associated with any home device and/or vehicle data may be transmitted to the user. In step 716, an insurance rate or adjustment for a user's home or vehicle may be determined, and in step 718, the rate or adjustment may be transmitted to the user.

If, in step 708, health/life data is available and accessible by the system, the health/life data may be received by the system in step 710. The health/life data may include eating habits, exercise habits, general wellness information, and the like. In some examples, health/life information may include whether the user regularly visits a doctor, whether the user has an annual blood screening, and the like. The health/life data may be voluntarily provided by the user, e.g., via user input received from a computing device in communication with or connected to the system. In some examples, some or all of the health/life data may be collected from user devices monitoring eating habits, exercise habits, and the like. For instance, the user may use a mobile device application that tracks a user's daily calorie intake, steps walked/run, exercise minutes, heart rate, pace, and the like. The data may be collected via one or more sensors (e.g., heart rate sensors, accelerometers, pedometers, etc.) associated with the mobile device, or a device in communication with the mobile device. The data may also be collected via user input. The mobile application may communicate with the system (e.g., system 300) to provide health/life data associated with the user to the system. In some examples, the user's exercise may indicate a risk. For instance, an individual's who is an avid skier may have a higher risk score than an individual who is a homebody.

In step 712, health/life data may be aggregated and/or analyzed with one or both of home device data and vehicle data to determine risk, etc. This data may then be used to notify a user of any issues associated with home devices, vehicles, etc. in step 714. In step 716, the home device, vehicle and health/life aggregated data may be used to determine/adjust a life insurance rate or premium. For instance, a risk or risk score for a user may be determined based on the health/lifestyle data received, home data received and/or auto data received. In some examples, the risk score for the individual may be based on health/lifestyle data such as level of exercise, frequency of exercise, type of exercise, etc., device data such a maintenance of home devices or lack of maintenance, and/or vehicle data such as driving behaviors (e.g., fast turns, quick stops, quick acceleration, etc.). This information may be used to predict potential losses, such as those based on an individual's behavior, such as theft, liability, etc. In step 718, the customer or user may be notified of any rate or adjustment.

FIG. 8 illustrates one example user interface 800 in which a user or customer of the entity or insurance company may input some basic information related to health or lifestyle habits. The user interface 800 includes field 802 for the name of the user and field 804 for the age of the user. In field 806, a user may identify an overall health status (e.g., poor, good, excellent, etc.). The overall health status in field 806 may be selected from a drop-down menu or may be directly input by the user.

In field 808, a user may identify typical exercise habits. For instance, as shown in FIG. 8, the user exercises approximately three times per week. Field 810 includes user input identifying the diet or eating habits of the user. In field 810, the user has identified a low fat diet. Various other types of diets may be input by the user (e.g., via selection from a drop-down menu), such as low-carb, high protein, low calorie, and the like.

Once the user has input the desired information, he or she may select "OK" option 812 to transmit the information to the system (e.g., system 300 in FIG. 3) for use in setting or adjusting insurance rates. Alternatively, a user may clear all inputs by selecting "CLEAR" option 814.

Various other methods of inputting data (e.g., selection of a radio button associated with options, and the like) may be used without departing from the invention. Further, additional user interfaces may be used to receive input from a user identifying specific health or lifestyle factors, such as example exercise activities, length of time per day of exercise, alcohol consumption, specific caloric intake per day, and the like. These additional user interfaces may be displayed to a user upon user selection of "OK" option 812 or upon the system receiving user input related to health/lifestyle information.

Provided below are various example arrangements of the sensing systems described herein and one or more implementations of such systems. The arrangements described below are merely some examples of systems and implementations, and nothing in the examples should be construed as limiting the invention to only those examples. Rather, various other systems and implementations may be used without departing from the invention.

In one example, data may be received from one or more sensors in communication with or connected to a water line on a refrigerator. In some examples, the sensors may monitor the condition of the water line to determine an approximate age or likelihood of failure of the water line. For instance, a sensor may monitor an amount of flow through a water line (e.g., reduced flow may indicate buildup in the water line which may indicate an age of the water line or likelihood of failure). In another example, a sensor may monitor the flexibility or brittleness of the water line to determine whether the water line material has deteriorated, thus increasing a likelihood of failure. Sensors may transmit this data to the system for analysis and/or aggregation with other types of data to determine a likelihood of failure and/or an insurance rate adjustment. In some examples, the user may be offered a rebate, lower insurance rate, or other incentive to replace the water line prior to failure in order to avoid the failure.

As discussed above, the data collected may be used to determine whether one or more home devices are operating within an expected range. The data may also be used to determine home activity levels, as well as various usage patterns within the home. This information may be useful in providing insurance-based rebates, discounts, etc., as well as aiding users in securing safe, efficient living environments.

In some arrangements, the systems, methods, etc. described herein may be used to proactively make changes to a system that will reduce risk associated with a home, thereby protecting the user, homeowner, etc. For instance, upon detection of home being unoccupied, the system may automatically lock the doors of the home to reduce risk of burglary, vandalism, etc.

In another example, a sensor may determine that a dryer lint basket is full, which may be a fire hazard. Accordingly, an alert may be transmitted to the user to empty the lint basket.

In still another example, a device may determine that a sewage pipe is backing up. In some examples, an alert may be transmitted to the user to notify him/her of the situation.

Sensor/monitor data may also be used to identify and/or prevent or reduce damage from various other issues in a home. For instance, sensor data may indicate movement of a foundation, which may be indicative of foundation issues. In another example, a moisture sensor in a basement may indicate moisture levels in the basement, on walls, etc. that may aid in predicting mold growth.

Various other sensing arrangements of one or more appliances, systems, etc. may be used without departing from the invention.

The systems described herein provide various advantages. For instance, monitoring of one or more home devices, vehicle or driving characteristics and/or health or lifestyle information may aid in identifying potential issues. For instance, monitoring of various systems, etc. may provide an early warning of a potential failure or early warning of an actual failure. For instance, the monitoring system may detect moisture in a home (e.g., a broken pipe, etc.) in which the homeowners are away. In some examples, the system may alert the homeowner who may then have someone shut off the water in order to minimize the damage. In another example, a moisture sensor may detect a small amount of moisture and alert the user before the user would have detected the moisture himself. These early warning systems may reduce or eliminate damage.

Further, monitoring of various driving characteristics or health/lifestyle characteristics may raise awareness. For instance, a user may be unaware that he or she tends to exceed the speed limit when driving. In another example, a user may be unaware that he or she uses his or her mobile device while driving as often as he or she does. Accordingly, monitoring these aspects and notifying the user of the characteristics may raise awareness and cause the user to make safer or healthier decisions.

Further still, the systems described herein may be used with a variety of sensors or sensing devices. In some examples, the user may be able to install the sensors themselves without any additional assistance. Some sensors may be relatively inexpensive which may be another incentive for users to install one or more sensors or monitoring devices.

In addition, a user may select or determine the data that is made available to any entity (e.g., an insurance company) implementing the system. Accordingly, if a user desires to have the data collected in order to monitor his or her home, vehicle, lifestyle, etc. without providing the data to any outside entity, he or she may do so. In another example, a user may choose to provide a portion of the collected data to the entity. The entity may then provide increasing incentives for users who provide more information (e.g., the more data provided to the entity, the greater the incentive or benefit to the user from the entity).

The systems, methods, etc. described herein may aid customers in reducing the risk of potentially costly home disasters, lifestyle issues, etc. The data collected may provide the user with useful information about their homes, lives, etc. that may improve their lives, provide increased safety and efficiency in the home, and the like.

The systems, apparatuses, computer-readable media and methods described above may further provide for increased accuracy in identifying risk associated with a home, user, etc. Accordingly, one or more insurance rates, premiums, and the like, may be adjusted based on this more accurate risk.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A system, comprising:
a processing unit comprising a processor; and
a memory unit storing computer-executable instructions, which when executed by the processing unit, cause the system to:
establish, with one or more sensing devices associated with a home device located in a home, a first wireless connection;
receive, while the first wireless connection is established and via the first wireless connection, and from the one or more sensing devices associated with the home device, one or more signals;

process, by an application executing on the system, the one or more received signals to determine one or more operating characteristics of the home device associated with the sensing device;

determine, based on the determined one or more operating characteristics of the home device associated with the sensing device, whether the home device is operating within an expected operating range;

responsive to determining that the home device is operating within the expected operating range, generate a first insurance rate for insuring the home;

responsive to determining that the home device is not operating within the expected operating range, generate a second insurance rate for insuring the home, the second insurance rate being different from the first insurance rate;

establish, with a mobile device, a second wireless connection, wherein the mobile device is different from the one or more sensing devices; and send, while the second wireless connection is established, via the second wireless connection, and to the mobile device, one of the first insurance rate and the second insurance rate to insure the home.

2. The system of claim 1, further including instructions that, when executed, cause the system to:

receive data associated with an identification of the home device; and determine an age of the home device wherein determining the age of the home device is based on the one or more operating characteristics and the received data associated with identification of the home device.

3. The system of claim 2, wherein the data associated with the home device includes at least one of: a manufacturer of the home device, a model of the home device, a serial number of the home device, and a year of manufacture of the home device.

4. The system of claim 2, further including instructions that, when executed, cause the system to determine, based on the one or more operating characteristics, a determined likelihood of failure of the home device.

5. The system of claim 4, wherein at least one of: the first insurance rate and the second insurance rate is generated based on the age of the home device and the determined likelihood of failure.

6. The system of claim 1, further including instructions that, when executed, cause the system to:

responsive to determining that the home device is not operating within the expected operating range, determine whether a failure of a portion of the home device or the home device entirely is detected.

7. The system of claim 1, further including instructions, that, when executed, cause the system to:

identify, based on the determined one or more operating characteristics of the home device, a pattern of usage of the home, and wherein at least one of: the first insurance rate and the second insurance rate are generated based on the pattern of usage of the home.

8. A method, comprising:

establishing, with one or more sensing devices associated with a home device located in a home, a first wireless connection;

receiving, while the first wireless connection is established, via the first wireless connection, and from the one or more sensing devices associated with the home device, one or more signals;

processing, by an application executing on a sensing system having at least one processor, the one or more received signals to determine one or more operating characteristics of the home device associated with the sensing device;

determining, based on the determined one or more operating characteristics of the home device associated with the sensing device, whether the home device is operating within an expected operating range;

if it is determined that the home device is operating within the expected operating range, generating a first insurance rate for insuring the home;

if it is determined that the home device is not operating within the expected operating range, generating a second insurance rate for insuring the home, the second insurance rate being different from the first insurance rate;

establishing, with a mobile device, a second wireless connection, wherein the mobile device is different from the one or more sensing devices; and sending, while the second wireless connection is established, via the second wireless connection, and to the mobile device, one of the first insurance rate and the second insurance rate to insure the home.

9. The method of claim 8, further including:

receiving data associated with an identification of the home device; and determining an age of the home device wherein determining the age of the home device is based on the one or more operating characteristics and the received data associated with identification of the home device.

10. The method of claim 9, wherein the data associated with the home device includes at least one of: a manufacturer of the home device, a model of the home device, a serial number of the home device, and a year of manufacture of the home device.

11. The method of claim 9, further including determining, based on the one or more operating characteristics, a determined likelihood of failure of the home device.

12. The method of claim 11, wherein at least one of: the first insurance rate and the second insurance rate is generated based on the age of the home device and the determined likelihood of failure.

13. The method of claim 8, further including:

when it is determined that the home device is not operating within the expected operating range, determining whether a failure of a portion of the home device or the home device entirely is detected.

14. The method of claim 8, further including instructions, that, when executed, cause the system to:

identifying, based on the determined one or more operating characteristics of the home device, a pattern of usage of the home, and wherein at least one of: the first insurance rate and the second insurance rate are generated based on the pattern of usage of the home.

15. A system, comprising:

a processing unit comprising a processor; and a memory unit storing computer-executable instructions, which when executed by the processing unit, cause the system to:

establish, with one or more sensing devices associated with a home device located in a home, a first wireless connection;

receive, while the first wireless connection is established and via the first wireless connection, and from the one or more sensing devices associated with the home device, one or more signals;

process, by an application executing on the system, the one or more received signals to determine one or more operating characteristics of the home device associated with the sensing device;

determine, based on the determined one or more operating characteristics of the home device associated with the sensing device, whether the home device is operating within an expected operating range;

responsive to determining that the home device is operating within the expected operating range, store the determined one or more operating characteristics;

responsive to determining that the home device is not operating within the expected operating range:
  generate a notification indicating that the home device is not operating within the expected operating range;
  establish, with a mobile device, a second wireless connection, wherein the mobile device is different from the one or more sensing devices; and
  send, while the second wireless connection is established, via the second wireless connection, and to the mobile device, the generated notification.

16. The system of claim 15, further including instructions that, when executed, cause the system to:
receive data associated with an identification of the home device; and
determine an age of the home device wherein determining the age of the home device is based on the one or more operating characteristics and the received data associated with identification of the home device.

17. The system of claim 16, wherein the data associated with the home device includes at least one of: a manufacturer of the home device, a model of the home device, a serial number of the home device, and a year of manufacture of the home device.

18. The system of claim 16, further including instructions that, when executed, cause the system to determine, based on the one or more operating characteristics, a determined likelihood of failure of the home device.

19. The system of claim 18, further including instructions that, when executed, cause the system to: generate an insurance rate for the home based on the determination of whether the one or more operating characteristics are within the expected operating range, the age of the home device and the determined likelihood of failure.

20. The system of claim 15, further including instructions that, when executed, cause the system to:
responsive to determining that the home device is not operating within the expected operating range, determine whether a failure of a portion of the home device or the home device entirely is detected.

* * * * *